(12) United States Patent
Alharbi et al.

(10) Patent No.: US 8,089,878 B2
(45) Date of Patent: *Jan. 3, 2012

(54) ALLOCATING BANDWIDTH IN A RESILIENT PACKET RING NETWORK BY P CONTROLLER

(76) Inventors: Fahd Alharbi, Jeddah (SA); Nirwan Ansari, Montville, NJ (US)

( * ) Notice: Subject to any disclaimer, the term of this patent is extended or adjusted under 35 U.S.C. 154(b) by 91 days.

This patent is subject to a terminal disclaimer.

(21) Appl. No.: 12/479,574

(22) Filed: Jun. 5, 2009

(65) Prior Publication Data

US 2010/0309776 A1 Dec. 9, 2010

(51) Int. Cl.
*H04L 12/26* (2006.01)
*H04J 3/16* (2006.01)
(52) U.S. Cl. ........................ 370/232; 370/468
(58) Field of Classification Search .......... 370/229–232, 370/235, 468
See application file for complete search history.

(56) References Cited

U.S. PATENT DOCUMENTS

| | | | | |
|---|---|---|---|---|
| 6,005,901 A * | 12/1999 | Linz | ............................. | 375/355 |
| 7,047,312 B1 * | 5/2006 | Aweya et al. | ................. | 709/235 |
| 7,197,564 B1 * | 3/2007 | Bhoj et al. | ..................... | 709/225 |
| 7,369,504 B2 | 5/2008 | Davis | | |
| 7,397,813 B2 | 7/2008 | Chloe et al. | | |
| 2003/0163593 A1 * | 8/2003 | Knightly | ........................ | 709/251 |
| 2004/0114520 A1 * | 6/2004 | Davis | ......................... | 370/236.1 |
| 2005/0100031 A1 * | 5/2005 | Choe et al. | .................... | 370/404 |
| 2005/0259689 A1 | 11/2005 | Bestavros et al. | | |
| 2006/0250986 A1 | 11/2006 | Alharbi et al. | | |
| 2006/0268704 A1 | 11/2006 | Ansari et al. | | |
| 2007/0121505 A1 | 5/2007 | Ansari et al. | | |
| 2007/0121511 A1 * | 5/2007 | Morandin | ..................... | 370/235 |
| 2008/0253325 A1 * | 10/2008 | Park et al. | ..................... | 370/329 |

OTHER PUBLICATIONS

Australian Patent Office, International Search Report and Written Opinion of the International Searching Authority for PCT/US2010/037290, prepared on Jun. 28, 2010 and mailed on Jul. 20, 2010, Australia.
Australian Patent Office, International Search Report and Written Opinion of the International Searching Authority for PCT/US2010/037303, prepared on Jul. 23, 2010 and mailed on Aug. 18, 2010, Australia.
Knightly, et al., The IEEE 802.17 media access protocol for high-speed metropolitan-area resilient packet rings, Network IEEE, May-Jun. 2004, pp. 8-15, vol. 18, Issue 3, USA.

* cited by examiner

*Primary Examiner* — Aung S Moe
*Assistant Examiner* — Kerri Rose

(57) ABSTRACT

Implementations and techniques for allocating bandwidth in a resilient packet ring network by a P-type controller are generally disclosed.

12 Claims, 8 Drawing Sheets

900 A computer program product.

902 A signal bearing medium.

904 machine-readable instructions, which, if executed by one or more processors, operatively enable a computing device to:

determine a fair rate to facilitate an allocated bandwidth in a resilient packet ring network via a P-type controller associated with at least one node of the resilient packet ring network; or stabilize one or more forwarding rates associated with at least one node of the resilient packet ring network under unbalanced traffic scenarios, based at least in part on the allocated bandwidth.

| 906 a computer-readable medium. | 908 a recordable medium. | 190 a communications medium. |

FIG. 9

US 8,089,878 B2

ALLOCATING BANDWIDTH IN A RESILIENT PACKET RING NETWORK BY P CONTROLLER

CROSS-REFERENCES TO OTHER APPLICATIONS

The present application is related to U.S. application Ser. No. 12/479,483 filed Jun. 5, 2009, entitled ALLOCATING BANDWIDTH IN A RESILIENT PACKET RING NETWORK BY PI CONTROLLER by Fahd Alharbi and Nirwan Ansari.

BACKGROUND

Resilient Packet Ring (RPR) networks are often utilized as a metro technology due at least in part on protection and fault tolerance properties. However, some metro networking technologies exhibit several limitations. For example, in a Synchronous Optical Networking-type (SONET) ring, individual nodes may be granted with a minimum fair share; however, it may not be possible to reclaim the unused bandwidth. Moreover, a percentage of the potentially available bandwidth may be reserved for protection, thus potentially resulting in poor utilization. On the other hand, a Gigabit Ethernet-type ring may result in full statistical multiplexing at the expense of fairness. RPR networks may be utilized to mitigate the respective underutilization and unfairness problems associated with the current SONET-type ring and Ethernet-type ring technologies.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 9 illustrates an example computer program product; and

DETAILED DESCRIPTION

Figure 1:
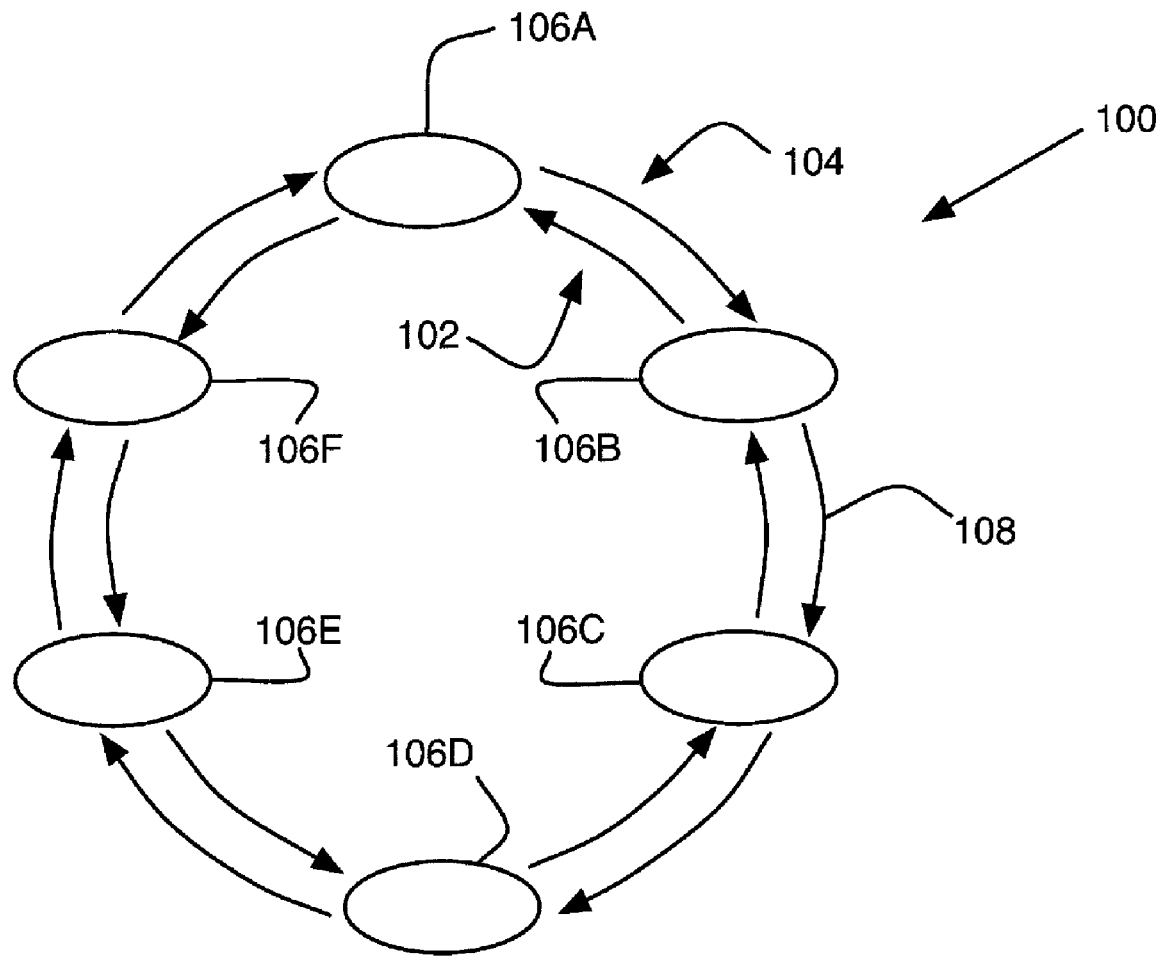
FIG. 1 illustrates a diagram of an example RPR ring.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and/or computer program products related to allocating bandwidth in a resilient packet ring (RPR) network by a proportional (P-type) controller.

RPR networks may be utilized as a high-speed backbone technology for metropolitan area networks. For example, RPR networks may be introduced to mitigate underutilization and unfairness problems associated with SONET-type ring and Ethernet-type ring technologies, respectively. Some performance objectives of RPR may include achieving high bandwidth utilization, optimum spatial reuse on the dual rings of an RPR, and/or fairness.

One challenge may be to design an algorithm that can react dynamically to the traffics in achieving such performance objectives. Aggressive mode (RPR-AM) and conservative mode (RPR-CM) RPR fairness algorithms may be comparatively simple processes, but may pose some limitations. For example, one such limitation may be that the amount of bandwidth allocated by RPR-CM and/or RPR-AM may oscillate under unbalanced traffic scenarios. Such unbalanced traffic scenarios will be described in greater detail below with respect to examples illustrated in FIGS. 5 and 6. These oscillations may be a barrier to achieving spatial reuse and/or high bandwidth utilization. Moreover, the performance of RPR-CM and/or RPR-AM may be sensitive to algorithm parameter settings. Accordingly, methods, apparatus, systems and/or computer program products related to allocating bandwidth in a RPR network via a P-type controller will be described below to address limitations of RPR-CM and/or RPR-AM fairness algorithms.

FIG. 1 illustrates a diagram of an example RPR network 100 in accordance with one or more example implementations. RPR network 100 may include two rotating ringlets. For example, one such ringlet may be referred to as the inner ringlet 102, and the other such ringlet may be referred to as the outer ringlet 104. Inner and outer ringlets 102, 104 may traverse two or more nodes. For example, inner and outer ringlets 102, 104 may traverse nodes 106A, 106B, 106C, 106D, 106E, and 106F. A portion of inner ringlet 102 or outer ringlet 104 that operably associates two adjacent nodes 106A, 106B together may be referred to as a link 108. Accordingly, inner ringlet 102 and/or outer ringlet 104 may include several links 108 operably associated between two or more nodes 106A, 106B, 106C, 106D, 106E, and 106F. In operation, information may enter RPR network 100 at a given upstream node, such as node 106A, and may pass along inner ringlet 102 or outer ringlet 104 via one or more links 108 to a downstream destination node, such as node 106B. In such a case, when such information reaches a downstream destination node, such as node 106B, such information may then pass out of RPR network 100.

Figure 2:
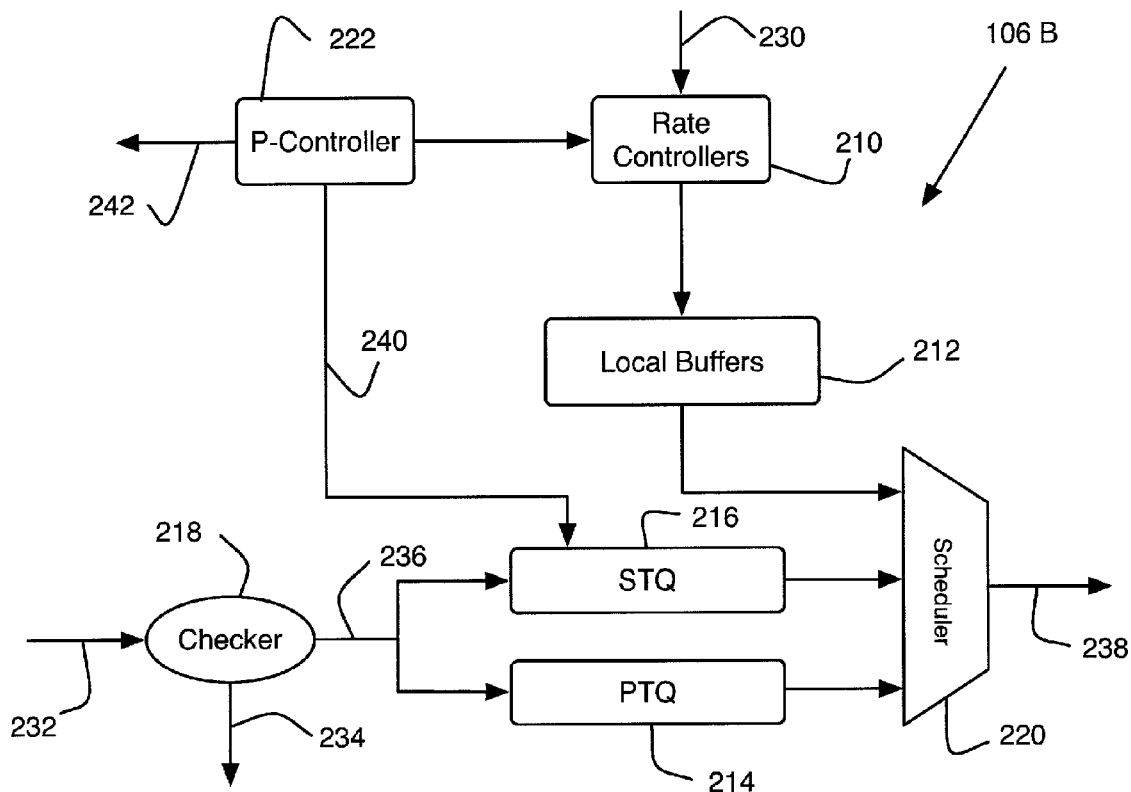
FIG. 2 illustrates a block diagram of a given node of an example RPR ring.

FIG. 2 illustrates a block diagram of a given node 106B of an example RPR network 100 (FIG. 1) arranged in accordance with one or more example implementations of the present disclosure. Node 106B may include hardware, software and/or any combination thereof capable of performing the functions of ingress data measurements, congestion, and bandwidth allocation. For example, node 106B may include one or more rate controllers 210, one or more local buffers 212, a primary transit queue (PTQ) buffer 214, a secondary transit queue (STQ) buffer 216, a checker 218, a scheduler 220, and/or a P-type controller 222. These functional units may operate to perform a flow control in the RPR network 100 (FIG. 1). Such flow control may allow a congested node 106B to send a fairness message (derived according to measurements made at node 106B) to one or more upstream nodes 106A, etc. (FIG. 1). Such a fairness message may result in one or more upstream nodes 106A, etc. (FIG. 1) throttling ingress information rates in order to reduce and/or eliminate a state of congestion at congested node 106B and apply fairness among participating nodes 106A, etc. (FIG. 1).

Node 106B may utilize one or more rate controllers 210 to throttle station traffic 230 entering RPR network 100 (FIG. 1). For example, rate controller 210 may throttle station traffic 230 on a per-destination basis to support virtual destination queuing and/or avoid head-of-line blocking (HOL). As used herein, HOL blocking may refer to situations where a head-of-line packet of a certain buffer cannot be switched to a destination because of congestion along the path from source to destination, potentially resulting in the rest of the packets in that buffer being blocked by that head-of-line packet, even if there is no congestion along the path from the source to their destinations. Additionally or alternatively, rate controller 210 may permit station traffic 230 to be delivered to local buffer 212. Local buffer 212 may define several service classes of user traffic. For example, local buffer 212 may define Class A user traffic with guaranteed rate and jitter; Class B user traffic with a committed information rate (CIR) and bounded delay and jitter; and/or Class C user traffic as best effort traffic.

Checker 218 may receive inlet traffic 232 from ringlet (not shown) into node 106B. Checker 218 may shunt egress traffic 234 out of node 106B. Additionally or alternatively, checker 218 may forward transit traffic 236 through to PTQ buffer 214 and/or STQ buffer 216.

Scheduler 220 may coordinate the flow of information out from PTQ buffer 214, STQ buffer 216, and/or local buffer 212. For example, scheduler 220 may selectively permit outlet traffic 238 from PTQ buffer 214, STQ buffer 216, and/or local buffer 212 to exit node 106B to continue along RPR network 100 (FIG. 1). For example, 220 may selectively permit outlet traffic 238 from PTQ buffer 214 first. In cases where PTQ buffer 214 is empty, STQ buffer 216 may have priority over the station traffic from local buffers 212. For example, STQ buffer 216 may have priority over the station traffic from local buffers 212 in cases where the STQ queue length exceeds an STQ threshold; otherwise, the station traffic 230 may be served. In such a case, station traffic 230 may be divided into one or more classes of importance, such as Class A, Class B, Class C, and/or the like. For example station traffic 230 may be served in the following order: Class A traffic, then Class B traffic. In cases where node 106B has no Class A or B traffic, then Class C traffic may be served.

P-type controller 222 may receive traffic measurements, including transit queue length 240. For example, P-type controller 222 may receive traffic measurements regarding a transit queue length 240 associated with STQ buffer 216. Based at least in part on such traffic measurements, P-type controller 222 may apply a fairness algorithm to determine a fair rate F(n). Such a determined fair rate may be utilized to allocate bandwidth in RPR network 100 (FIG. 1). For example, such a determined a fair rate may be sent to upstream nodes 106A, etc. (FIG. 1) in the form of a control message 242. Such upstream nodes 106A, etc. (FIG. 1) that receive control message 242 may use the control message information and/or local information to throttle rates accordingly.

Figure 3:
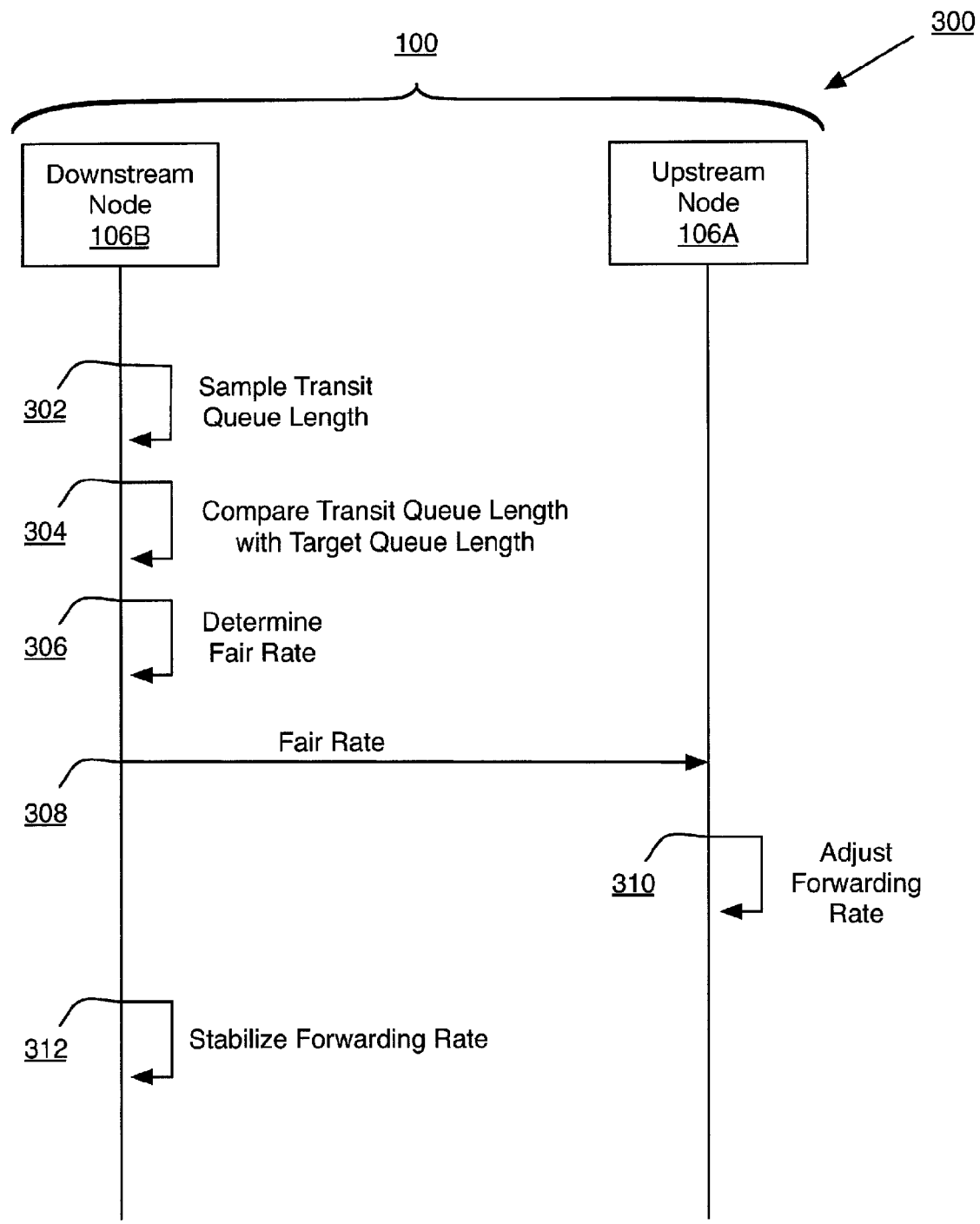
FIG. 3 illustrates a flow chart illustrating an example process for allocating bandwidth in a resilient packet ring network.

FIG. 3 illustrates a flow chart illustrating an example process 300 for allocating bandwidth in a resilient packet ring network arranged in accordance with one or more example implementations. Process 300, and other processes described herein, set forth various functional blocks or actions that may be described as processing steps, functional operations, events and/or acts, etc., and that may be performed by hardware, software, and/or firmware. Those skilled in the art in light of the present disclosure will recognize that numerous alternatives to the functional blocks shown in FIG. 3 may be practiced in various implementations. For example, although process 300, as shown in FIG. 3, comprises one particular order of blocks or actions, the order in which these blocks or actions are presented does not necessarily limit claimed subject matter to any particular order. Likewise, intervening actions not shown in FIG. 3 and/or additional actions not shown in FIG. 3 may be employed and/or some of the actions shown in FIG. 3 may be eliminated, without departing from the scope of claimed subject matter.

As illustrated, process 300 may be implemented to allocate bandwidth in a resilient packet ring network. Processing begins at action 302, where at the end of a given sampling time T, a P-type controller 222 (FIG. 2) at downstream node 106B may sample the current transit queue length. For example, downstream node 106B may sample the current transit queue length of STQ buffer 216 (FIG. 2). As used herein, the term "sampling time T" may refer to a sampling time between a determination of a current fair rate F(n) and a determination of a prior fair rate F(n−1). Processing continues from action 302 to 304 where the transit queue length may be compared with a target queue length. For example, P-type controller 222 (FIG. 2) at downstream node 106B may compare the current transit queue length of STQ buffer 216 (FIG. 2) with a previously specified target queue length.

Continuing to action 306, a fair rate may be determined. For example, P-type controller 222 (FIG. 2) at downstream node 106B may determine a fair rate based at least in part on the comparison of the current transit queue length of STQ buffer 216 (FIG. 2) to the previously specified target queue length. In one implementation, such a fair rate may be determined so as to allocate bandwidth in RPR network 100 via P-type controller 222 (FIG. 2) associated with at least one node of RPR network 100, such as downstream node 106B, for example.

Continuing to action 308, such a determined fair rate may be forwarded to one or more upstream nodes 106A. For example, downstream node 106B may forward a fair rate to one or more upstream nodes 106A on an opposite ringlet 102 (FIG. 1). Accordingly, individual upstream nodes 106A may be made aware of the supported fair rates at downstream node 106B. Additionally or alternatively, similar fair rates may be determined broadcast from other nodes (such as nodes 106C, etc.) in RPR network 100. Accordingly, individual nodes 106A, 106B, etc. in RPR network 100 may be made aware of the supported fair rates at downstream node 106B, and/or the supported fair rates at individual nodes 106A, 106B, etc. in RPR network 100.

Continuing to action 310, upstream node 106A may adjust its forwarding rate. For example, upstream node 106A may adjust its forwarding rate based at least in part on the fair rate received from downstream node 106B. As will be discussed in greater detail below, the operation of procedure 300 may result in stabilizing these forwarding rates, as is illustrated at action 312. For example, one or more forwarding rates associated with one or more of individual nodes 106A, 106B, etc. in RPR network 100 may be stabilized under unbalanced traffic scenarios, based at least in part on an allocation of bandwidth, discussed above with respect to action 306. In one implementation, at action 312, downstream node 106B may repeat one or more of actions 302-308 to stabilize the forwarding rate associated with upstream node 106A. Additionally or alternatively, similar actions may be taken at other nodes (such as nodes 106C, etc.) in RPR network 100. Accordingly, individual nodes 106C, 106D, etc. (FIG. 1) in RPR network 100 may also stabilize forwarding rates respectively associated with the individual nodes 106C, 106D, etc. (FIG. 1) in RPR network 100. Additionally or alternatively, such stabilization of forwarding rates may be achievable under unbalanced traffic scenarios.

Figure 4:
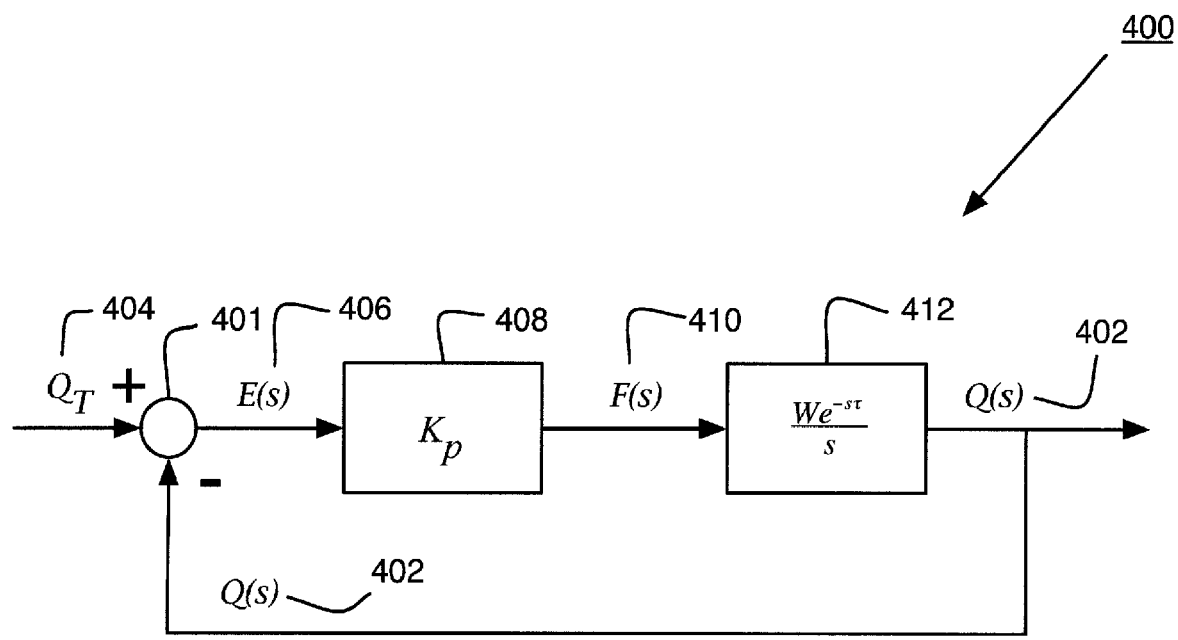
FIG. 4 illustrates an example control process for allocating bandwidth in a resilient packet ring network.

FIG. 4 illustrates an example control process 400 for allocating bandwidth in a resilient packet ring network arranged in accordance with one or more example implementations. Process 400, and other processes described herein, set forth various functional blocks or actions that may be described as processing steps, functional operations, events and/or acts, etc., and that may be performed by hardware, software, and/or firmware. Those skilled in the art in light of the present disclosure will recognize that numerous alternatives to the functional blocks shown in FIG. 4 may be practiced in various implementations. For example, although process 400, as shown in FIG. 4, comprises one particular order of blocks or actions, the order in which these blocks or actions are presented does not necessarily limit claimed subject matter to any particular order. Likewise, intervening actions not shown in FIG. 4 and/or additional actions not shown in FIG. 4 may be employed and/or some of the actions shown in FIG. 4 may be eliminated, without departing from the scope of claimed subject matter.

As illustrated, control process 400 may be implemented to allocate bandwidth in a resilient packet ring network. At block 401, a comparison of the transit queue length Q(s) 402 and the target queue length $Q_T$ 404 may be made. For example, an error E(s) 406 may be determined to quantify such a comparison of the transit queue length Q(s) 402 and the target queue length $Q_T$ 404. In one implementation, error E(s) 406 may be determined based at least in part on the following equation:

$$E(s) = Q_T(s) - Q(s) \quad \text{(eq. 1)}$$

Processing continues from block 401 to block 408, where a fair rate F(s) 410 may be determined based at least in part on the comparison of the transit queue length Q(s) 402 and the target queue length $Q_T$ 404. For example, error E(s) 406 may be modified based at least in part on a proportional gain $k_p$ to result in fair rate F(s) 410, as illustrated at block 408. In one implementation, fair rate F(s) 410 may be determined based at least in part on the following equation:

$$F(s) = k_p E(s) \quad \text{(eq. 2)}$$

Processing continues from block 408 to block 412, where an updated transit queue length Q(s) 402 may be determined.

For example, updated transit queue length Q(s) 402 may be determined based at least in part on fair rate F(s) 410. In one implementation, fair rate F(s) 410 may be modified based at least in part on the following equation to determine updated transit queue length Q(s) 402:

$$Q(s) = \frac{\sum_{i=1}^{N} w_i e^{-s\tau_i}}{s} F(s) \quad \text{(eq. 3)}$$

Block 412 of the control process 400 is illustrated in FIG. 4 where W may represent a sum of weights associated with various nodes of a RPR network as follows:

$$W = \sum_{i=1}^{N} w_i \quad \text{(eq. 4)}$$

Additionally, $\tau_i$ may represent the round trip delay between a bottleneck link 108 (FIG. 1) and a source node i of a RPR network. Such a round trip delay $\tau_i$ may represent an amount of time between initiation of communications at downstream node 106B (FIG. 1) and receipt at upstream node 106A (FIG. 1), represented by backward delay $\tau_i^b$, and may represent an amount of time between initiation of communications at upstream node 106A (FIG. 1) and receipt at downstream node 106B (FIG. 1), represented by forward delayed $\tau_i^f$. For example, round trip delay $\tau_i$ may be calculated as $\tau_i = \tau_i^b + \tau_i^f$, where $\tau_i^b$ may represent a backward delay from a bottlenecked link 108 (FIG. 1) to a source node i, and where $\tau_i^f$ may represent a forward delay from source node i to bottlenecked link 108 (FIG. 1). In one implementation, $\tau$ may represent an upper bound of such a round trip delay $\tau_i$.

More particularly, control process 400 may be better understood with reference to the following discussion regarding the formation of control process 400. At a bottleneck link 108 (FIG. 1) associated with a downstream node 106B (FIG. 1), a rate of change of a transit queue length 402 may be written as follows:

$$q'(t) = \sum_{i=1}^{N} r_i(t - \tau_i^f) - C \quad \text{(eq. 5)}$$

In such a case, $r_i$ may represent a transmitting rate of source node i, such as upstream node 106A (FIG. 1), $\tau_i^f$ may represent the forward delay from source node i to the bottlenecked link 108 (FIG. 1), t may represent time, N may represent the number of source nodes, and C may represent the available bandwidth of downstream node 106B (FIG. 1) associated with bottleneck link 108 (FIG. 1). For example, a rate of change of a transit queue length 402 may be proportional to traffic transmitted from upstream source nodes i through bottleneck link 108 (FIG. 1) associated with downstream node 106B (FIG. 1), when taking into consideration available bandwidth C and forward delay $\tau_i^f$.

One or more of source nodes i, such as upstream node 106A (FIG. 1), may transmit information at rate according to a received fair rate f from the bottlenecked link 108 (FIG. 1) associated with a downstream node 106B (FIG. 1) as follows:

$$r_i(t) = w_i f(t - \tau_i^b) \quad \text{(eq. 6)}$$

In such a case, $w_i$ may represent a weight less than or equal to one, and $\tau_i^b$ may represent the backward delay from bottlenecked link 108 (FIG. 1) associated with a downstream node 106B (FIG. 1) to source node i, such as upstream node 106A (FIG. 1).

A fair rate f(t) for bottlenecked link 108 (FIG. 1) associated with a downstream node 106B (FIG. 1) may be represented as follows:

$$f(t) = k_p e(t) \qquad (\text{eq. 7})$$

In such a case, $k_p$ may represent a proportional gain for a P-type controller, and $e(t) = q_T - q(t)$ may represent a difference between a transit queue length q(t) and a target queue length $q_T$.

RPR network 100 (FIG. 1) may be represented as closed-loop system that may include an equilibrium point at which $$\lim_{t \to \infty} q'(t) = 0, \; \lim_{t \to \infty} q(t) = q_T, \text{ and } \lim_{t \to \infty} f(t) = f^*.$$

such a case, f* may represent an optimal fair rate. Thus, (eq. 5), at the equilibrium point can be written as follows:

$$\sum_{i=1}^{N} r_i^* = C \qquad (\text{eq. 8})$$

In such a case, r* may represent an optimal rate that individual source nodes i, such as upstream node 106A (FIG. 1), may transmit through bottlenecked link 108 (FIG. 1) associated with a downstream node 106B (FIG. 1).

Using (eq. 8) and (eq. 6), the following may be obtained:

$$\sum_{i=1}^{N} w_i f^* = C \qquad (\text{eq. 9})$$

In such a case, (eq. 9) may establish that the P-type controller may achieve the following weighted max-min fair rates:

$$f^* = \frac{C}{\sum_{i=1}^{N} w_i} \qquad (\text{eq. 10})$$

In addition to the weighted max-min fair rates of (eq. 10) described above, stability conditions for controller gains, including proportional gain $k_p$ for P-type controller may be found. Using (eq. 5) and (eq. 6), the following may be obtained:

$$q''(t) = \sum_{i=1}^{N} w_i f'(t - \tau_i) \qquad (\text{eq. 11})$$

In such a case, $\tau_i = \tau_i^b + \tau_i^f$ may represent a round trip time between source node i, such as upstream node 106A (FIG. 1), and bottlenecked link 108 (FIG. 1) associated with a downstream node 106B (FIG. 1), for example.

By taking the Laplace transform of (eq. 8) and (eq. 11), the following (eq. 2) and/or (eq. 3), discussed above, may be obtained:

$$F(s) = k_p E(s) \qquad (\text{eq. 2})$$

and $$Q(s) = \frac{\sum_{i=1}^{N} w_i e^{-s\tau_i}}{s} F(s) \qquad (\text{eq. 3})$$

For simplicity, it may be assumed that round trip delay $\tau_i = \tau$, $\forall i \in N$. In such a case, $\tau$ may represent an upper bound of round trip delay $\tau_i$. Accordingly, control process 400 may be formulated based at least in part on (eq. 2), (eq. 3), and/or (eq. 1).

Control process 400 illustrated in FIG. 4, may be represented at least in part by a characteristic equation in the Laplace domain as follows:

$$1 + \frac{k_p W e^{-s\tau}}{s} = 0 \qquad (\text{eq. 12})$$

Through substitution of the following equations $s = j\omega$ and $e^{-j\omega\tau} = \cos(\omega\tau) - j \sin(\omega\tau)$, the following equation may be obtained:

$$k_p W \cos(\omega\tau) - j k_p W \sin(\omega\tau) = -j\omega \qquad (\text{eq. 13})$$

After some algebraic manipulation, the following conditions under which a closed-loop system may be stable may be obtained, based at least in part on (eq. 13), above:

$$0 < k_p < \frac{\pi}{2W\tau} \qquad (\text{eq. 14})$$

In such a case, W may represent a sum of weights associated with source nodes i of RPR network 100 (FIG. 1), and $\tau$ may represent an upper bound of such a round trip delay $\tau_i$ between a bottleneck link 108 (FIG. 1) associated with a downstream node 106B of RPR network 100 (FIG. 1) and an upstream node 106A (FIG. 1) of RPR network 100 (FIG. 1), for example. Accordingly, a determination of a fair rate, as discussed below, may be based at least in part on a round trip delay $\tau_i$ between a bottleneck link 108 (FIG. 1) of RPR network 100 (FIG. 1) and at least one of source nodes i of RPR network 100 (FIG. 1).

A discrete implementation of the P-type controller may be formed so as to take into consideration the occurrence of sampling at non-continuous times. Such a implementation of the P-type controller in discrete time may be based at least in part on a derivative of (eq. 7) in the real time domain and may be expressed as follows:

$$F(n) = F(n-1) - k_p(e(n) - e(n-1)). \qquad (\text{eq. 15})$$

In such a case, F(n) may represent a current fair rate, n may represent a sample time, F(n−1) may represent a prior fair rate, $K_p$ may represent a proportional gain, e(n) may represent a difference between the target queue length and a current transit queue length, and e(n−1) may represent a prior difference between the target queue length and a current transit queue length. Accordingly, a determination of a fair rate F(n) may be based at least in part on a difference between the target queue length and a current transit queue length. Additionally or alternatively, a determination of a fair rate F(n) may be based at least in part on rate of change of a difference between the target queue length and a current transit queue length.

Figure 5:
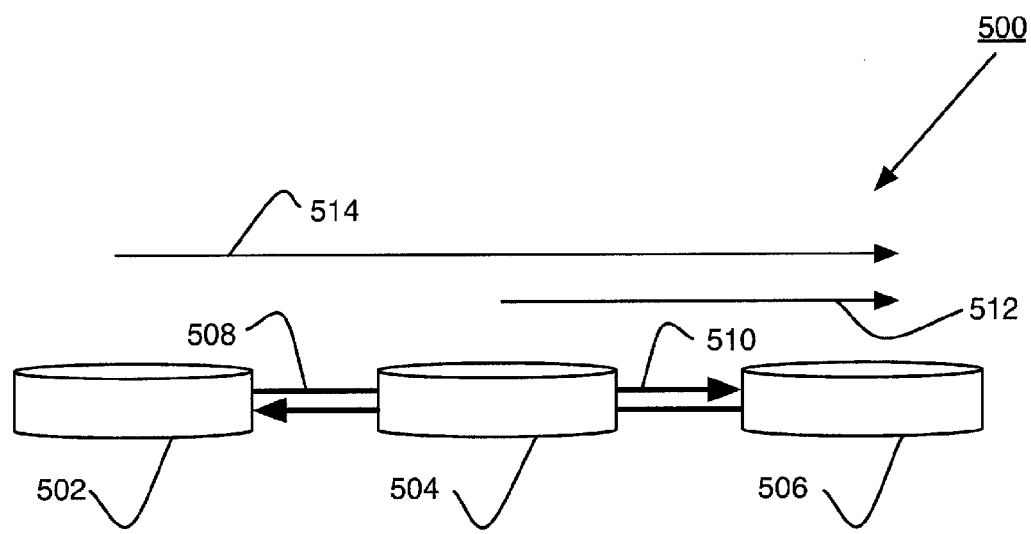
FIG. 5 illustrates a diagram of an example unbalanced traffic scenario.

FIG. 5 illustrates a diagram of an example unbalanced traffic scenario 500 arranged in accordance with the present disclosure. A P-type controller 222, as described in FIGS. 2-4 may be shown to stabilize one or more forwarding rates associated with nodes 106A, 106B, etc. in RPR network 100 under unbalanced traffic scenarios. As used herein the term "unbalanced traffic scenarios" may include scenarios where there is a variation among rates of information from upstream nodes 106A, etc. For example, unbalanced traffic scenarios may include scenarios where one or more rates of information from upstream nodes 106A, etc. are greedy while one or more rates of information from upstream nodes 106A, etc. are not greedy, such as by having a given predetermined rate, for example.

In this example unbalanced traffic scenario 500, flow from a first node 502 to a third node 506 may be greedy while a flow from a second node 504 to third node 506 may be at a low rate. For example, flow from second node 504 to third node 506 may be at a low rate of 50 megabits per second (Mbps). A link 508 between first node 502 and second node 504 as well as a link 510 between second node 504 and third node 506 may have fixed capacity, such as 622 Mbps. In unbalanced traffic scenario 500, second node 504 may become congested in instances where a sum of the rate of flow 512 from second node 504 to third node 506 and the rate of flow 514 from first node 502 to third node 506 is greater than the link 510 capacity between second node 504 and third node 506. In such a case, link 510 may be a bottleneck link and second node 504 may broadcast an updated fair rate to upstream nodes, such as first node 502. In the example unbalanced traffic scenario 500, forward delay $\tau_i^f$ may represent an amount of time a packet takes to go from first node 502 to STQ 216 (FIG. 2) of second node 504, while backward delay $\tau_i^b$ may represent an amount of time between initiation of communication of an updated fair rate at second node 504 and receipt at first node 502.

Figure 6:
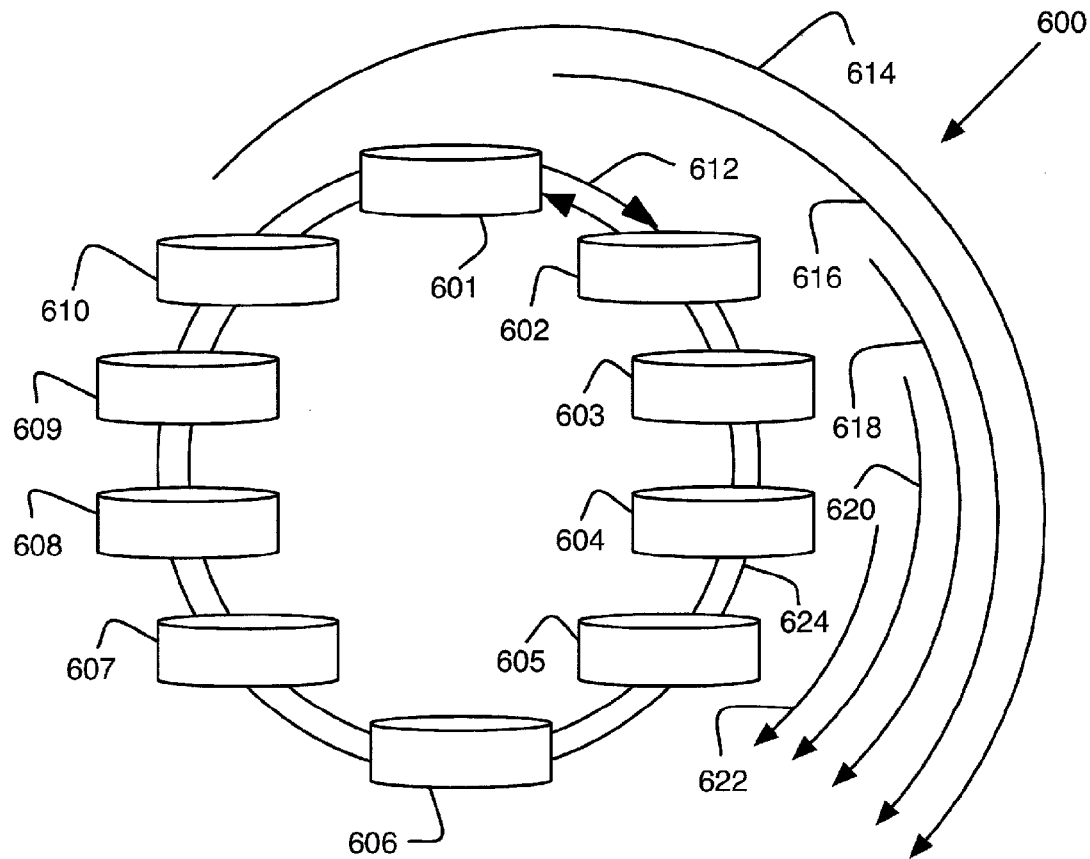
FIG. 6 illustrates a diagram of an example unbalanced traffic scenario.

FIG. 6 illustrates a diagram of an example unbalanced traffic scenario 600 arranged in accordance with the present disclosure. In this example unbalanced traffic scenario 600, there are ten nodes 601-610. In unbalanced traffic scenario 600, all of the links 612 have the same capacity, such as 622 Mbps, and each link 612 has a propagation delay of 0.1 ms. All forwarding rate flows are UDP flows where all flows start at time 0. Flow 614, flow 616, flow 618, and flow are greedy, and flow 622 has a rate equal to 50 Mbps. In unbalanced traffic scenario 600, unbalance traffic may occur at link 624. Without use of P-type controller 222 (FIG. 2) there may be oscillation during operation due to the unbalanced traffic at link 624. Such oscillation may result in a bandwidth loss. Moreover, without use of P-type controller 222 (FIG. 2), due to the congestion, the lengths of several transient queues associated with nodes 601-610 may be increased.

Figure 7:
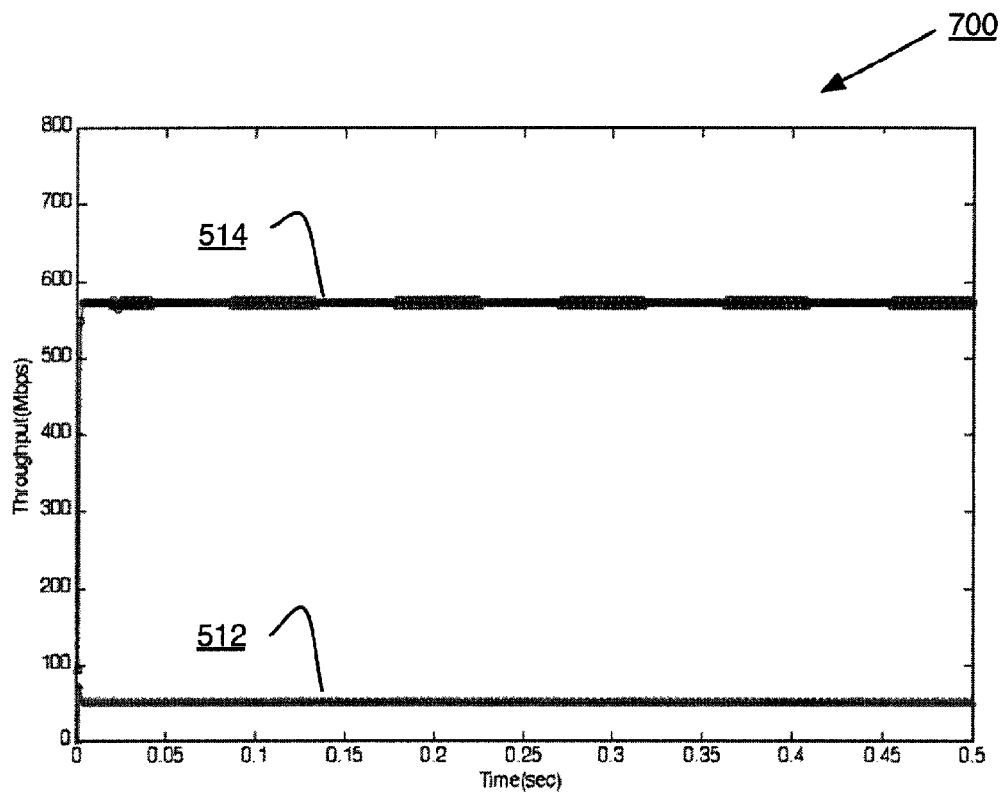
FIG. 7 illustrates a chart of throughput over time under an example unbalanced traffic scenario.

FIG. 7 illustrates a chart 700 of throughput over time under an example unbalanced traffic scenario 500, in accordance with the present disclosure. As illustrated, forwarding rate flows 512 and 514 may converge to their respective stabilized optimal fair rate. As used herein the term "stabilized" and/or the like may refer to being at a condition with little or no oscillation at the steady state.

Figure 8:
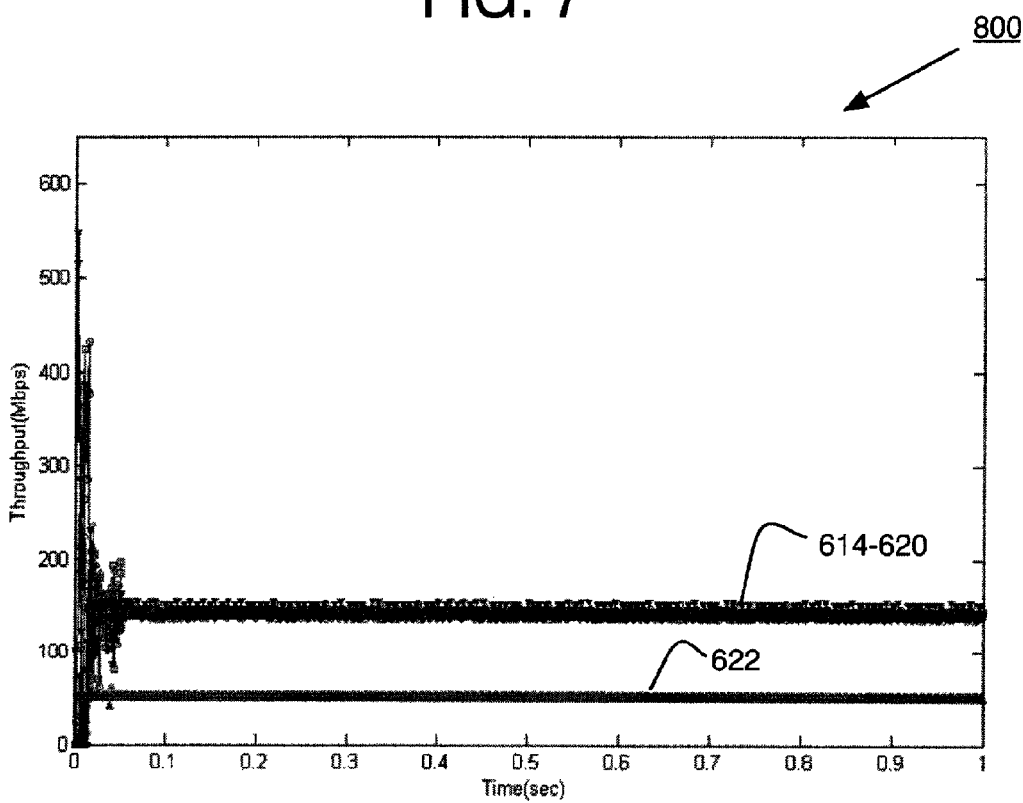
FIG. 8 illustrates a chart of throughput over time under an example unbalanced traffic scenario.

FIG. 8 illustrates a chart 800 of throughput over time under an example unbalanced traffic scenario 600, in accordance with the present disclosure. In the simulation results illustrated in FIG. 8, the measurement time interval was set to T=1 ms, and the target length of the transit queue was set to $$q_T = \frac{STQ - \text{size}}{16}.$$

The simulation results illustrated in FIG. 8 were obtained by using an RPR simulator as described in S. Gjessing, "The Simula RPR Simulator implemented in Java," Simula Research Laboratory Technical Report 2003-12, December 2003. As illustrated in FIG. 8, flows 614-620 and flow 622 may converge to their respective stabilized optimal fair rates at the steady state.

FIG. 9 illustrates an example computer program product 900 that is arranged in accordance with the present disclosure. Program product 900 may include a signal bearing medium 902. Signal bearing medium 902 may include one or more machine-readable instructions 904, which, if executed by one or more processors, may operatively enable a computing device to provide the functionality described above with respect to FIG. 3 and/or FIG. 4. Thus, for example, referring to the system of FIG. 2, P-type controller 222 may undertake one or more of the actions shown in FIG. 3 and/or FIG. 4 in response to instructions 904 conveyed by medium 902.

In some implementations, signal bearing medium 902 may encompass a computer-readable medium 906, such as, but not limited to, a hard disk drive, a Compact Disc (CD), a Digital Video Disk (DVD), a digital tape, memory, etc. In some implementations, signal bearing medium 902 may encompass a recordable medium 908, such as, but not limited to, memory, read/write (R/W) CDs, R/W DVDs, etc. In some implementations, signal bearing medium 902 may encompass a communications medium 910, such as, but not limited to, a digital and/or an analog communication medium (e.g., a fiber optic cable, a waveguide, a wired communications link, a wireless communication link, etc.).

Figure 10:
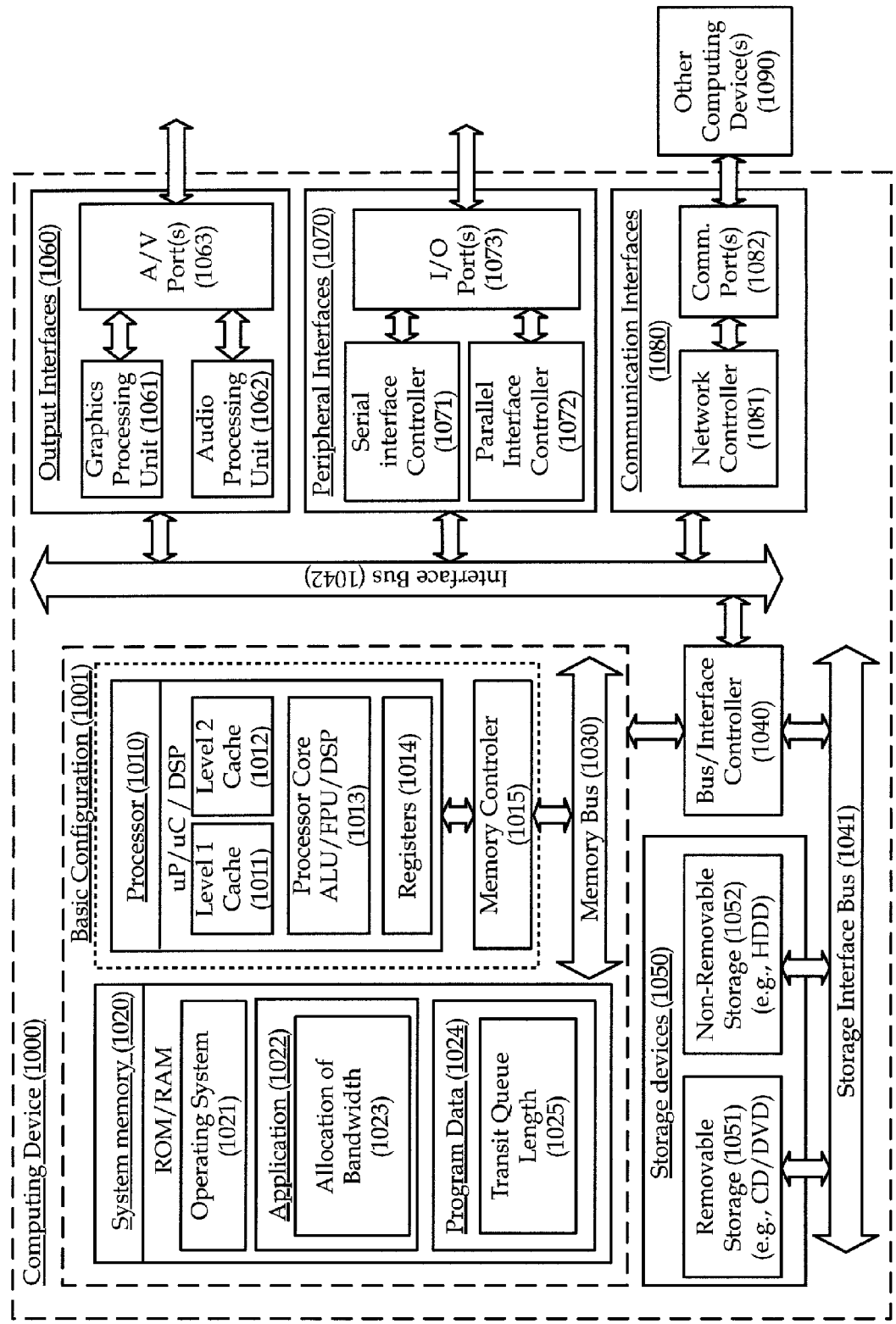
FIG. 10 is a block diagram illustrating an example computing device, all arranged in accordance with the present disclosure.

FIG. 10 is a block diagram illustrating an example computing device 1000 that is arranged in accordance with the present disclosure. In one example configuration 1001, computing device 1000 may include one or more processors 1010 and system memory 1020. A memory bus 1030 may be used for communicating between the processor 1010 and the system memory 1020.

Depending on the desired configuration, processor 1010 may be of any type including but not limited to a microprocessor (µP), a microcontroller (µC), a digital signal processor (DSP), or any combination thereof. Processor 1010 may include one or more levels of caching, such as a level one cache 1011 and a level two cache 1012, a processor core 1013, and registers 1014. The processor core 1013 may include an arithmetic logic unit (ALU), a floating point unit (FPU), a digital signal processing core (DSP Core), or any combination thereof. A memory controller 1015 may also be used with the processor 1010, or in some implementations the memory controller 1015 may be an internal part of the processor 1010.

Depending on the desired configuration, the system memory 1020 may be of any type including but not limited to volatile memory (such as RAM), non-volatile memory (such as ROM, flash memory, etc.) or any combination thereof. System memory 1020 may include an operating system 1021, one or more applications 1022, and program data 1024. Application 1022 may include an allocation of bandwidth algorithm 1023 in a resilient packet ring network that is arranged to perform the functions as described herein including the functional blocks and/or actions described with respect to process 300 of FIG. 3 and/or process 400 of FIG. 4. Program Data 1024 may include data 1025 for use in allocation of bandwidth algorithm 1023, for example, data corresponding to an indication of one or more transit queue lengths. In some example embodiments, application 1022 may be arranged to operate with program data 1024 on an operating system 1021 such that implementations of allocation of bandwidth may be provided as described herein. For example, RPR node 106B may comprise all or a portion of computing device 1000 and be capable of performing all or a portion of application 1022 such that implementations of allocation of bandwidth may be provided as described herein. This described basic configuration is illustrated in FIG. 10 by those components within dashed line 1001.

Computing device 1000 may have additional features or functionality, and additional interfaces to facilitate communications between the basic configuration 1001 and any required devices and interfaces. For example, a bus/interface controller 1040 may be used to facilitate communications between the basic configuration 1001 and one or more data storage devices 1050 via a storage interface bus 1041. The data storage devices 1050 may be removable storage devices 1051, non-removable storage devices 1052, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1020, removable storage 1051 and non-removable storage 1052 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1000. Any such computer storage media may be part of device 1000.

Computing device 1000 may also include an interface bus 1042 for facilitating communication from various interface devices (e.g., output interfaces, peripheral interfaces, and communication interfaces) to the basic configuration 1001 via the bus/interface controller 1040. Example output interfaces 1060 may include a graphics processing unit 1061 and an audio processing unit 1062, which may be configured to communicate to various external devices such as a display or speakers via one or more A/V ports 1063. Example peripheral interfaces 1060 may include a serial interface controller 1071 or a parallel interface controller 1072, which may be configured to communicate with external devices such as input devices (e.g., keyboard, mouse, pen, voice input device, touch input device, etc.) or other peripheral devices (e.g., printer, scanner, etc.) via one or more I/O ports 1073. An example communication interface 1080 includes a network controller 1081, which may be arranged to facilitate communications with one or more other computing devices 1090 over a network communication via one or more communication ports 1082. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 1000 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 1000 may also be implemented as a personal computer including both laptop computer and non-laptop computer configurations. In addition, computing device 1000 may be implemented as part of a wireless base station or other wireless system or device such as node 106B described above with respect to FIG. 2.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that when executed by a computing device, such as a computing system, computing platform, or other system, for example, may result in execution of a processor in accordance with claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It should also be understood that, the term "optimize" may include maximization and/or minimization. The term "minimization" and/or the like as used herein may include a global minimum, a local minimum, an approximate global minimum, and/or an approximate local minimum. Likewise, it should also be understood that, the term "maximization" and/or the like as used herein may include a global maximum, a local maximum, an approximate global maximum, and/or an approximate local maximum.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method implemented in a resilient packet ring network, comprising:
    measuring a current transit queue length;
    determining a fair rate to facilitate an allocated bandwidth in the resilient packet ring network via a P-type controller associated with at least one node of the resilient packet ring network, wherein determining the fair rate comprises determining a difference between a target queue length and the current transit queue length; and
    stabilizing one or more forwarding rates associated with the at least one node of the resilient packet ring network under unbalanced traffic scenarios, based at least in part on the allocated bandwidth,
    wherein the fair rate F(n) is expressed as:

$$F(n)=F(n-1)-k_p(e(n)-e(n-1))$$

where F(n−1) is a prior fair rate, where $K_p$ is a proportional gain, where e(n) is the difference between the target queue length and the current transit queue length, and where e(n−1) is a prior difference between the target queue length and the current transit queue length.

2. The method of claim 1, wherein determining the fair rate comprises determining rate of change of the difference between the target queue length and the current transit queue length.

3. The method of claim 1, wherein determining the fair rate comprises determining a round trip delay between a bottleneck link of the resilient packet ring network and the at least one node of the resilient packet ring network.

4. The method of claim 1, wherein the determination of a fair rate is based at least in part on a proportional gain $k_p$ expressed as:

$$0 < k_p < \frac{\pi}{2W\tau}$$

where W is a sum of weights associated with nodes of the resilient packet ring network, and where τ is based at least in part on a round trip delay between a bottleneck link of the resilient packet ring network and the at least one node of the resilient packet ring network.

5. An article for use with a resilient packet network, comprising:
    a non-transitory signal bearing medium comprising machine-readable instructions stored thereon, which, if executed by one or more processors, operatively enable a computing device to:
    measure a current transit queue length;
    determine a fair rate to facilitate an allocated bandwidth in the resilient packet ring network via a P-type controller associated with at least one node of the resilient packet ring network, wherein the determination of the fair rate comprises determining a difference between a target queue length and the current transit queue length; and
    stabilize one or more forwarding rates associated with the at least one node of the resilient packet ring network under unbalanced traffic scenarios, based at least in part on the allocated bandwidth,
    wherein the fair rate F(n) is expressed as:

$$F(n)=F(n-1)-k_p(e(n)-e(n-1))$$

where F(n−1) is a prior fair rate, where $K_p$ is a proportional gain, where e(n) is the difference between a target queue length and a current transit queue length, and where e(n−1) is a prior difference between the target queue length and a current transit queue length.

6. The article of claim 5, wherein the determination of a fair rate is based at least in part on rate of change of the difference between the target queue length and the current transit queue length.

7. The article of claim 5, wherein the determination of a fair rate is based at least in part on a round trip delay between a bottleneck link of the resilient packet ring network and the at least one node of the resilient packet ring network.

8. The article of claim 5, wherein the determination of a fair rate is based at least in part on a proportional gain $k_p$ expressed as:

$$0 < k_p < \frac{\pi}{2W\tau}$$

where W is a sum of weights associated with nodes of the resilient packet ring network, and where $\tau$ is based at least in part on a round trip delay between a bottleneck link of the resilient packet ring network and the at least one node of the resilient packet ring network.

9. A resilient packet ring network, comprising:
a plurality of nodes;
an inner ring of links associated between the plurality of nodes;
an outer ring of links associated between the plurality of nodes; and
a P-type controller associated with at least one of the plurality of nodes, wherein the P-type controller is configured to:
measure a current transit queue length;
determine a fair rate to facilitate an allocated bandwidth in the resilient packet ring network, wherein the determination of the fair rate comprises determining a difference between a target queue length and the current transit queue length, and
stabilize one or more forwarding rates associated with the at least one of the plurality of nodes under unbalanced traffic scenarios, based at least in part on the allocated bandwidth,
wherein the fair rate F(n) is expressed as:

$F(n) = F(n-1) - k_p(e(n) - e(n-1))$ where F(n−1) is a prior fair rate, where $K_p$ is a proportional gain, where e(n) is a difference between a target queue length and a current transit queue length, and where e(n−1) is the prior difference between the target queue length and a current transit queue length.

10. The resilient packet ring network of claim 9, wherein the determination of a fair rate is based at least in part on a proportional gain $k_p$ expressed as:

$$0 < k_p < \frac{\pi}{2W\tau}$$

where W is a sum of weights associated with nodes of the resilient packet ring network, and where $\tau$ is based at least in part on a round trip delay between a bottleneck link of the resilient packet ring network and the at least one node of the resilient packet ring network.

11. An apparatus for use with a resilient packet network, comprising:
a P-type controller associated with at least one of a plurality of nodes in the resilient packet ring network, wherein the P-type controller is configured to:
measure a current transit queue length;
determine a fair rate to facilitate an allocated bandwidth in the resilient packet ring network, wherein the determination of the fair rate comprises determining a difference between a target queue length and the current transit queue length; and
stabilize one or more forwarding rates associated with the at least one of the plurality of nodes of the resilient packet ring network under unbalanced traffic scenarios, based at least in part on the allocated bandwidth,
wherein the fair rate F(n) is expressed as:

$F(n) = F(n-1) - k_p(e(n) - e(n-1))$ where F(n−1) is a prior fair rate, where $K_p$ is a proportional gain, where e(n) is a difference between a target queue length and a current transit queue length, and where e(n−1) is the prior difference between the target queue length and a current transit queue length.

12. The apparatus of claim 11, wherein the P-type controller is further configured to determine the fair rate based at least in part on a proportional gain $k_p$ expressed as:

$$0 < k_p < \frac{\pi}{2W\tau}$$

where W is a sum of weights associated with nodes of the resilient packet ring network, and where $\tau$ is based at least in part on a round trip delay between a bottleneck link of the resilient packet ring network and the at least one node of the resilient packet ring network.

* * * * *

UNITED STATES PATENT AND TRADEMARK OFFICE
CERTIFICATE OF CORRECTION

PATENT NO.       : 8,089,878 B2
APPLICATION NO.  : 12/479574
DATED            : January 3, 2012
INVENTOR(S)      : Alharbi et al.

It is certified that error appears in the above-identified patent and that said Letters Patent is hereby corrected as shown below:

On the Title Page, Item (54), and in the specification, Column 1, Lines 2-3, in the Title, delete "P CONTROLLER" and insert -- P-TYPE CONTROLLER --, therefor.

On the Title Page, in the Figure, for Tag "222", in Line 1, delete "P-Controller" and insert -- P-type Controller --, therefor.

In the Drawings:

In Fig. 2, Sheet 2 of 8, for Tag "222", in Line 1, delete "P-Controller" and insert -- P-type Controller --, therefor.

In Fig. 9, Sheet 7 of 8, in Box "190", in Line 1, delete "190" and insert -- 910 --, therefor.

In Fig. 10, Sheet 8 of 8, in box "(1015)", in Line 1, delete "Controler" and insert -- Controller --, therefor.

In the Specifications:

In Column 7, Line 22, delete "such" and insert -- In such --, therefor.

In Column 8, Line 58, delete "$K_p$" and insert -- $k_p$ --, therefor.

In Column 11, Line 23, delete "hard-disk drives (HDD)," and insert -- hard disk drives (HDDs), --, therefor.

In Column 11, Line 25, delete "solid state drives (SSD)," and insert -- solid state drives (SSDs), --, therefor.

Signed and Sealed this
Twenty-seventh Day of August, 2013

Teresa Stanek Rea
*Acting Director of the United States Patent and Trademark Office*

CERTIFICATE OF CORRECTION (continued)
U.S. Pat. No. 8,089,878 B2

In Column 11, Line 35, delete "digital versatile disks (DVD)" and insert -- digital versatile disks (DVDs) --, therefor.

In the Claims:

In Column 16, Line 10, in Claim 1, delete "$K_p$" and insert -- $k_p$ --, therefor.

In Column 16, Lines 23-24, in Claim 4, delete "a fair" and insert -- the fair --, therefor.

In Column 16, Line 24, in Claim 4, delete "a proportional" and insert -- the proportional --, therefor.

In Column 16, Line 57, in Claim 5, delete "$K_p$" and insert -- $k_p$ --, therefor.

In Column 16, Lines 58-59, in Claim 5, delete "a target queue length and a current" and insert -- the target queue length and the current --, therefor.

In Column 16, Line 61, in Claim 5, delete "a current" and insert -- the current --, therefor.

In Column 16, Lines 62, in Claim 6, delete "a fair" and insert -- the fair --, therefor.

In Column 16, Line 66, in Claim 7, delete "a fair" and insert -- the fair --, therefor.

In Column 17, Line 3, in Claim 8, delete "a fair" and insert -- the fair --, therefor.

In Column 17, Line 4, in Claim 8, delete "a proportional" and insert -- the proportional --, therefor.

In Column 17, Line 40, in Claim 9, delete "$K_p$" and insert -- $k_p$ --, therefor.

In Column 17, Lines 41-42, in Claim 9, delete "a target queue length and a current" and insert -- the target queue length and the current --, therefor.

In Column 17, Line 44, in Claim 9, delete "a current" and insert -- the current --, therefor.

In Column 17, Line 46, in Claim 10, delete "a fair" and insert -- the fair --, therefor.

In Column 17, Lines 46-47, in Claim 10, delete "a proportional" and insert -- the proportional --, therefor.

In Column 18, Line 28, in Claim 11, delete "$K_p$" and insert -- $k_p$ --, therefor.

In Column 18, Lines 29-30, in Claim 11, delete "a target queue length and a current" and insert -- the target queue length and the current --, therefor.

In Column 18, Line 32, in Claim 11, delete "a current" and insert -- the current --, therefor.